United States Patent
Ziegenfuss

(10) Patent No.: US 7,584,610 B2
(45) Date of Patent: Sep. 8, 2009

(54) WATER CYCLING SYSTEM WITH COMPRESSOR MOTIVE FORCE AND WITH TURBINE ELECTRIC POWER GENERATOR

(76) Inventor: Mark R. Ziegenfuss, 445 County Rd. 579, Ringoes, NJ (US) 08551

( * ) Notice: Subject to any disclaimer, the term of this patent is extended or adjusted under 35 U.S.C. 154(b) by 223 days.

(21) Appl. No.: 11/811,124

(22) Filed: Jun. 8, 2007

(65) Prior Publication Data
US 2008/0303282 A1 Dec. 11, 2008

(51) Int. Cl.
F04F 1/00 (2006.01)
(52) U.S. Cl. .......................... 60/398; 290/54
(58) Field of Classification Search ............. 290/54, 290/43
See application file for complete search history.

(56) References Cited

U.S. PATENT DOCUMENTS

| | | | |
|---|---|---|---|
| 3,643,426 A | 2/1972 | Janelid | |
| 3,939,356 A * | 2/1976 | Loane | 290/52 |
| 4,030,303 A * | 6/1977 | Kraus et al. | 60/688 |
| 4,041,710 A * | 8/1977 | Kraus et al. | 60/673 |
| 4,052,858 A | 10/1977 | Jeppson | |
| 4,091,623 A | 5/1978 | Edmondson et al. | |
| 4,157,014 A * | 6/1979 | Clark, Jr. | 60/655 |
| 4,306,416 A * | 12/1981 | Iozzi | 60/641.11 |
| 4,370,860 A * | 2/1983 | Assaf | 60/641.11 |
| 4,375,831 A * | 3/1983 | Downing, Jr. | 165/48.1 |
| 4,392,062 A * | 7/1983 | Bervig | 290/54 |
| 4,426,846 A * | 1/1984 | Bailey | 60/398 |
| 4,430,858 A * | 2/1984 | Shaw | 60/398 |
| 4,443,707 A | 4/1984 | Scieri et al. | |
| 4,542,625 A | 9/1985 | Bronicki | |
| 4,767,938 A * | 8/1988 | Bervig | 290/54 |
| 4,800,727 A * | 1/1989 | Petrick | 60/649 |
| 4,947,647 A * | 8/1990 | Jensen | 60/659 |
| 5,400,598 A | 3/1995 | Moritz et al. | |
| 6,672,054 B2 * | 1/2004 | Merswolke et al. | 60/398 |
| 2006/0032374 A1 * | 2/2006 | Vrana et al. | 95/258 |

FOREIGN PATENT DOCUMENTS

JP 57148011 A * 9/1982
JP 02196168 A * 8/1990

* cited by examiner

*Primary Examiner*—Joseph Waks
(74) *Attorney, Agent, or Firm*—Kenneth P. Glynn, Esq.

(57) ABSTRACT

A water cycling system with compressor motive force and with turbine electric power generation, includes: (a) a water piping subsystem that has a circuitous loop means for continuously or intermittently circulating water in a loop, the loop having an upward flowing side and a downward flowing side, the loop having a bottom level and a top level with a head differential of at least fifty feet between the bottom level and the top level; (b) an air compressor subsystem including at least one air compressor having a compressed air outlet with the air outlet being located below the top level in the upwardly flowing side of the loop; and, (c) at least one electric power generating water-driven turbine located within the loop. In some instances the subsystem of piping is part of a water well; in other instances, part of a geothermal well; in yet other instances a different system, such as an above-ground system, e.g. a water tower.

12 Claims, 10 Drawing Sheets

WATER CYCLING SYSTEM WITH COMPRESSOR MOTIVE FORCE AND WITH TURBINE ELECTRIC POWER GENERATOR

BACKGROUND OF INVENTION a. Field of Invention

The invention relates generally to a system for generating electric power from a turbine generator located within a water cycling system. Due to the nature of the head created in this system by use of compressor motive force to force air into the cycling water below the top of the cycle, a boosting affect is accomplished and the cycling water is used to turn the turbine generator.

b. Description of Related Art

The following patents relate to power generation:

U.S. Pat. No. 5,400,598 to Alex Moritz et al. shows that power is generated from a two-phase geothermal fluid containing a substantial amount of non-condensable gases, typically not less than about three percent by extracting a geothermal fluid from the ground under its own pressure, and passing the extracted geothermal fluid through an indirect heat exchange device containing an organic fluid for vaporizing the latter and producing vaporized organic fluid and heat depleted geothermal fluid. The vaporized organic fluid is expanded in a turbine coupled to a generator for producing power and expanded vaporized organic fluid which is condensed to a liquid and returned to the indirect heat exchange device. Finally, the heat depleted geothermal fluid may be returned to the ground via a rejection well.

U.S. Pat. No. 4,542,625 to Lucien Y. Bronicki describes a geothermal power plant for operating on geothermal fluid which includes an open cycle power plant responsive to the geothermal fluid for producing power and producing heat depleted geothermal fluid. Associated with the open cycle power plant is a closed Rankine cycle organic fluid power plant for producing power. Heat from the geothermal fluid is transferred to the closed cycle power plant; and heat depleted geothermal fluid is injected into a rejection well. The open cycle power plant includes a condenser that operates at a pressure greater than or equal to about atmospheric pressure with the result that the condenser is directly vented to the rejection well. Uncondensible gases contained in the geothermal fluid are thus passed directly into the rejection well making the power plant environmentally acceptable. The operation of the condenser at a pressure greater to or equal to atmospheric pressure eliminates the need for a vacuum pump and thus increases the useful work produced by the hybrid power plant so constructed, and simplifies its design and operation. The same approach is applicable to elimination of noncondensible gases in steam produced in industrial processes rather than from a geothermal well.

U.S. Pat. No. 4,443,707 to Frank Scieri et al. describes a hydro electric generating system to produce power by changing the potential energy of water to kinetic energy to drive a turbine that is coaxially connected to a generator. Water from the ambient enters the reservoir and is directed by a valve to a conduit to the turbine which turns a generator to produce electricity. The system is constructed in such a matter that it may supply power during peak power demand and be used as a storage system during low power demand.

U.S. Pat. No. 4,091,623 to Jerry M. Edmondson et al. describes a method and apparatus for implementing the same to provide fresh potable water and electric power from a source of natural brine by the use of energy derived from a geothermal source of pressurized fluid that is of a temperature of greater than 212 degrees Fahrenheit, and which fluid may contain numerous minerals and extraneous material entrained and/or dissolved therein, together with apparatus for carrying out the method. In addition, the invention encompasses a method of providing a clean source of heat for energy conversion from a geothermal source together with an apparatus for carrying out the method.

U.S. Pat. No. 4,052,858 to Morris R. Jeppson describes steam resources, which may in some cases be forms heretofore considered unusable because of low energy content or corrosive contamination, are used for electrical power and water treatment operations in installations where these formerly separate activities may be combined, with the waste products of one being a valuable input to the other. In one embodiment, discharge heat from a steam driven generating station and contaminated sewage water, each of which formerly presented costly or environmentally hazardous disposal problems, are combined to produce sterilized water reusable for crop irrigation. In another embodiment, fresh water enroute to a municipal utility system is used to condense discharge steam from generating station turbines for return to the boilers while sterilizing the water to reduce or eliminate cholorination requirements. Still another embodiment enables use of turbine driven generators to produce electrical power from corrosive geothermal steam sources without exposure of the turbines to such steam and sewage water may be sterilized as a by-product of the system. Means are also disclosed for the large scale pumping of water utilizing such steam energy.

U.S. Pat. No. 3,643,426 to Ingvar Janelid describes a powerplant which is driven by a gas turbine. The compressed air for the gas turbine is accumulated in a rock chamber. The rock chamber communicates through a conduit with a lake, so that the rock chamber can receive water to any desired level. A pump is arranged in said conduit, to assist the flow of water from the lake to the rock chamber or vice versa.

Notwithstanding the prior art, the present invention is neither taught nor rendered obvious thereby.

SUMMARY OF INVENTION

The present invention water cycling system with compressor motive force and with turbine electric power generation, includes: (a) a well that has a circuitous loop means for continuously or intermittently circulating water in a loop, the loop having an upward flowing side and a downward flowing side, the loop having a bottom level and a top level with a head differential of at least fifty feet between the bottom level and the top level; (b) an air compressor subsystem including at least one air compressor having a compressed air outlet with the air outlet located below the top level in the upwardly flowing side of the loop; and, (c) at least one electric power generating water-driven turbine located within the loop.

In some preferred embodiments of the present invention water cycling system, the compressed air outlet is positioned at least twenty feet below the top level of the loop. In some preferred embodiments of the present invention water cycling system, the compressed air outlet is positioned at least fifty feet below the top level of the loop. In some preferred embodiments of the present invention water cycling system, the compressed air outlet is positioned at least one hundred feet below the top level of the loop.

In some preferred embodiments of the present invention water cycling system, the turbine is located upstream from the compressed air outlet. Upstream in this context means physically below the compressed air outlet because the compressed air outlet is, as stated above, located in the upwardly flowing side of the loop.

In some preferred embodiments of the present invention water cycling system, the electric power generating water-driven turbine is located proximate the bottom level of the loop. Proximate here means within the bottom ten percent of the height of the upwardly flowing side of the loop. While this is not essential, it is essential that the turbine be located in a position in the loop to generate electric power, and in many embodiments, near the bottom is preferred. However, in some embodiments, the loop side may be too deep and the compressed air may not lift the water against the friction of the turbine. Thus, the position of the turbine is a function of the depth, the size (cross section or diameter) of the loop, the size of the compressor (volume and flow rate) and the size (resistance) of the turbine. Parameters were actually tested and some of the data below provides insight into these relationships.

In some preferred embodiments of the present invention water cycling system, the well may have an inside diameter of about four inches to about six feet. However, larger and smaller systems may be used. In some preferred embodiments, the downside and upside of the loop may be concentric pipe or conduit and thus, cross sectional areas are considered. In such embodiments, the downside flow may be through the inner or the outer pipe or conduit and the upside flow accordingly complementary. In these cases, the ratio of the inside conduit or pipe to the outside conduit or pipe may be 5:1 to 1:5, although 2:2 to 1:2 is more preferred. The air compressor, in some preferred embodiments, may have an output of about as little as 20 cfm to thousands of cfm, depending upon the size and depth of the system.

In some preferred embodiments of the present invention water cycling system, the head differential of the well is at least one hundred feet.

In other alternative embodiments of the present invention water cycling system with compressor motive force and with turbine electric power generation, the system includes: (a) a geothermal well that has a circuitous loop means for continuously or intermittently circulating water in a loop, the loop having an upward flowing side and a downward flowing side, the loop having a bottom level and a top level with a head differential of at least fifty feet between the bottom level and the top level; (b) an air compressor subsystem including at least one air compressor having a compressed air outlet with the air outlet being located below the top level in the upwardly flowing side of the loop; and, (c) at least one electric power generating water-driven turbine located within the loop.

In some preferred embodiments of this present invention water cycling system, the compressed air outlet is positioned at least twenty feet below the top level of the loop. Fifty and one hundred feet minimum levels are also preferred in other embodiments of this geothermal well. Any geothermal well depth may be used.

The present invention water cycling system, the turbine is located upstream from the compressed air outlet.

The present invention water cycling system, the electric power generating water-driven turbine is located proximate the bottom level of the loop. Proximate is defined above.

The present invention water cycling system, the geothermal well has any inside diameter or cross section pipe or conduit described above, except that in geothermal systems, concentric piping or conduit is not used except at the surface where heat exchange is intended. The compressor or compressors should be sized with the cross section, flow and depth desired. This is easily approximated based on information set forth below, but can also be determined by formula, or by experience.

In some preferred embodiments of the present invention water cycling system, the head differential of the geothermal well is at least one hundred feet and may be hundreds of feet or more.

In some preferred embodiments of the present invention water cycling system with compressor motive force and with turbine electric power generation, the system is above-ground. It includes: (a) a water piping subsystem that has a circuitous loop means for continuously or intermittently circulating water in a loop, the loop having an upward flowing side and a downward flowing side, the loop having a bottom level and a top level with a head differential of at least fifty feet between the bottom level and the top level; (b) an air compressor subsystem including at least one air compressor having a compressed air outlet with the air outlet being located below the top level in the upwardly flowing side of the loop; and, (c) at least one electric power generating water-driven turbine located within the loop.

In some preferred embodiments of the present invention water cycling system, the compressed air outlet is positioned at least twenty, at least fifty or at least one hundred feet below the top level of the loop.

In some preferred embodiments of the present invention water cycling system, the turbine is located upstream from the compressed air outlet.

In some preferred embodiments of the present invention water cycling system, the electric power generating water-driven turbine is located proximate the bottom level of the loop.

In this present invention water cycling system, the water piping subsystem, has an dimensions in accordance with the foregoing teachings herein, and the same applies for the compressor(s). Likewise, all of the other parameters set forth in this section above for wells apply here for the above-ground systems.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention and are incorporated in and constitute a part of this specification, illustrate preferred embodiments of the invention and together with the detail description serve to explain the principles of the invention. In the drawings.

DETAILED DESCRIPTION OF THE EMBODIMENTS

Figure 1:
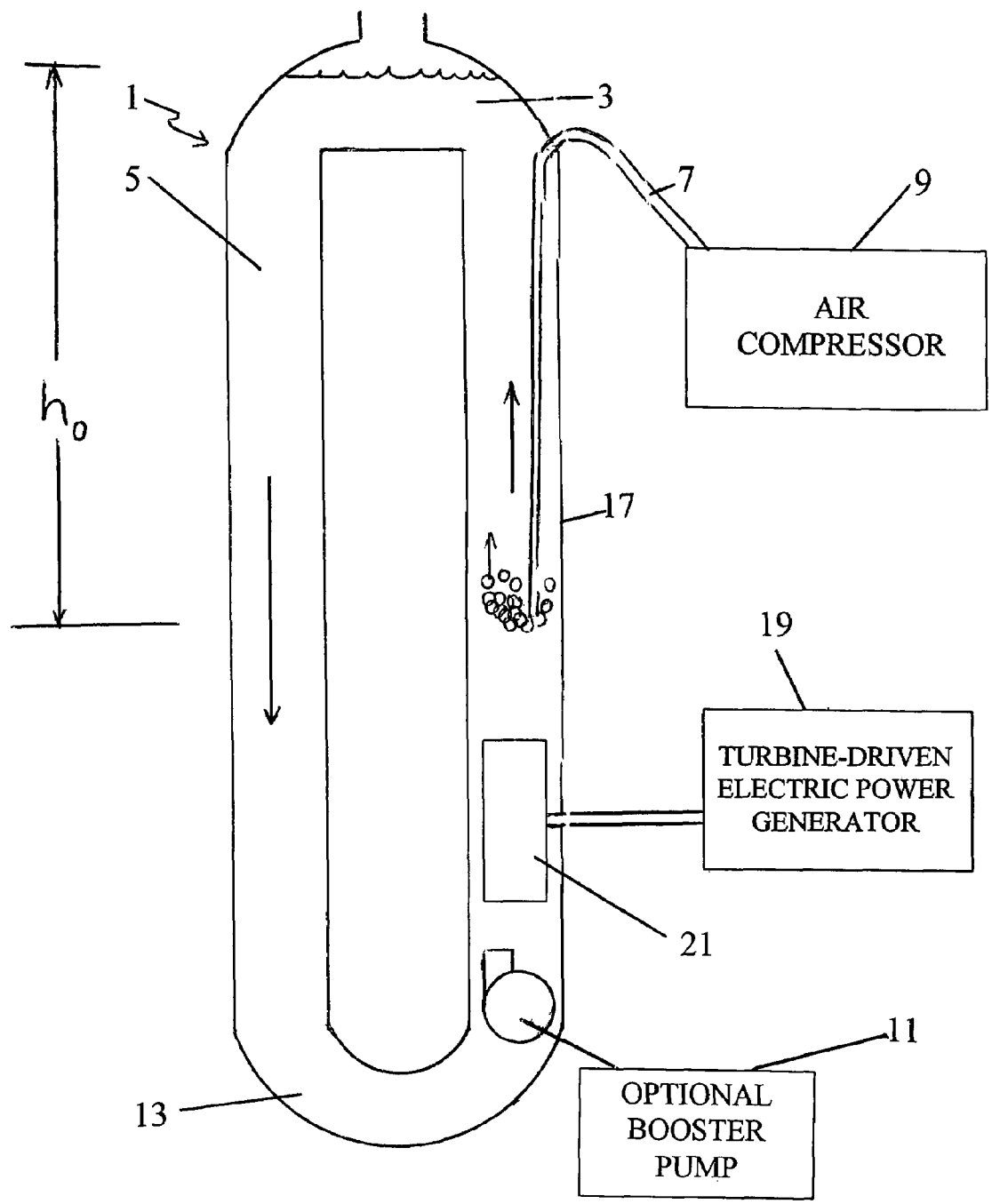
FIG. 1 illustrates the present invention water cycling system with compressor motive force and with turbine electric power generation, in a diagrammatic format.

Referring now to the drawings, FIG. 1 illustrates a present invention water cycling system with compressor motive force and with turbine electric power generation, in a diagrammatic format, in a very broad sense. FIG. 1 shows present invention water cycling system 1 with a circuitous loop of water flow made up of a top level 3 with an air vent at the apex, a downward flowing side, here, conduit or downward flow pipe 5, bottom 13 and an upward flowing side, here, upward flow pipe 17. Upward flow pipe 17 connects back to top level 3 to complete the water cycle loop. There is an air compressor 9 that has a compressed air outlet line 7 that has an outlet in the upward flow pipe 17. The compressed air outlet line 7 discharges at some measurable level below the top level 3 of the water cycle loop. As discussed above, the deeper its location, the greater the apparent head differential between the downward flowing side and the upward flowing side to create more power to drive turbine 21 of turbine-driven electric power generator 19. Turbine 21 drives electric power generator 19 to produce electricity and the turbine 21 is located upstream (below) the compressed air outlet, as shown. The outlet of compressed air outlet line 7 is located at a depth of $h_0$ below the top level 3. When the compressor 9 is not operating, the upward flow side and the downward flow side of the loop have the same top elevation, namely, top level 3. However, when air compressor 9 is turned on, the air flowing into the pipe 17 creates an apparent or virtual water top at the outlet level and a virtual head of water with ahead differential of about of $h_0$ is established.

An optional booster pump 11 is shown as this may be useful for initial start up of the system to overcome static pressures. Also, it may be beneficial during operation of the system, depending upon the depth of the compressed air outlet line and on the ratings of the turbine and the generator. If a larger turbine is used with a smaller compressor, a booster pump will be beneficial and net energy advantages still achieved.

Figure 2:
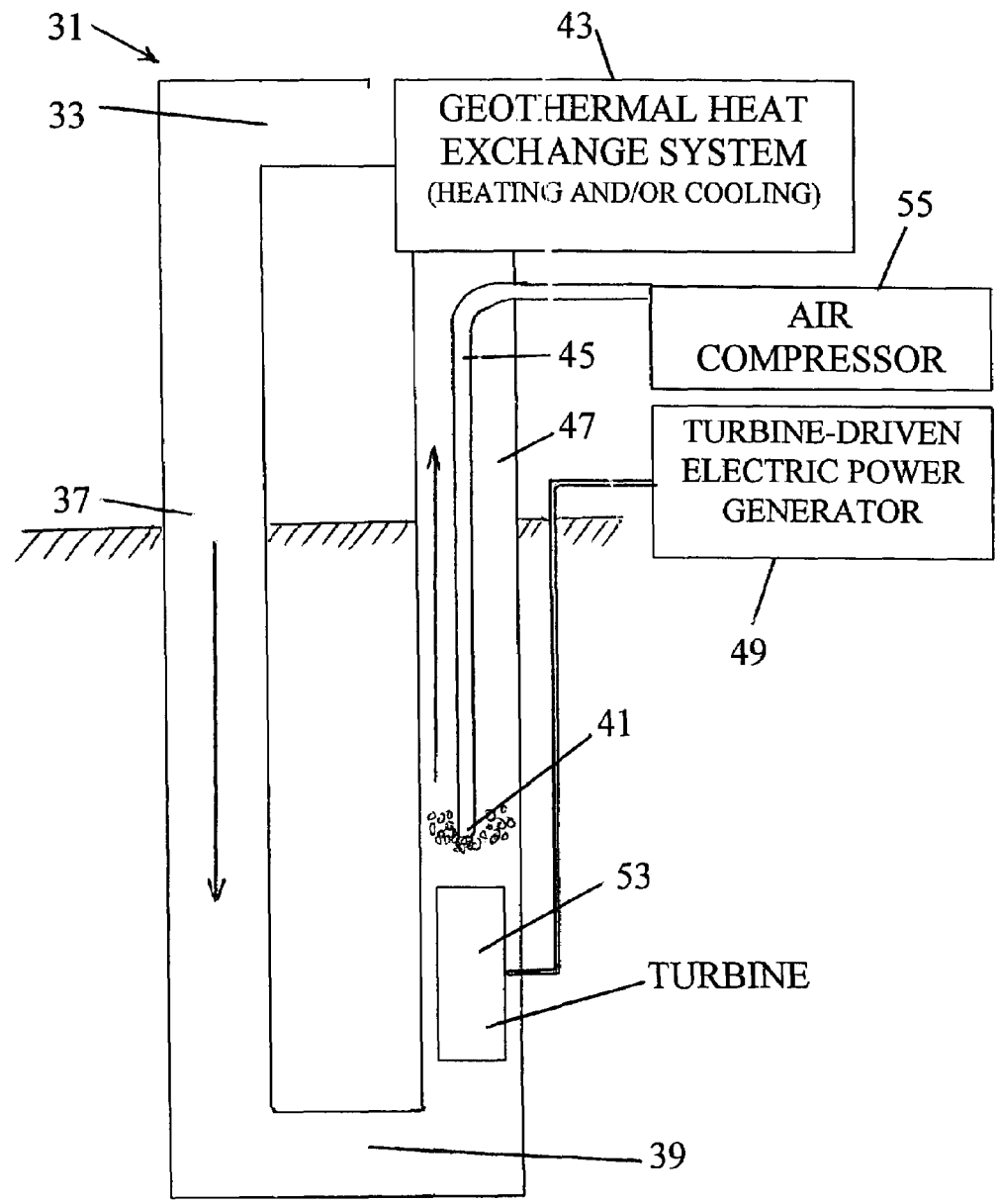
FIG. 2 illustrates the present invention water cycling system with compressor motive force and with turbine electric power generation for a geothermal in-ground water cycling system.

FIG. 2 illustrates the present invention water cycling system with compressor motive force and with turbine electric power generation for a geothermal in-ground water cycling system. FIG. 2 illustrates a present invention water cycling system with compressor motive force and with turbine electric power generation, in a diagrammatic format, for use with a geothermal heating and/or cooling system. FIG. 2 shows present invention water cycling system 31 with a circuitous loop of water flow made up of a top level 33 with an air vent at the apex, a downward flowing side, namely, downward flow pipe 37, bottom 39 and an upward flowing side, namely, upward flow pipe 47. Upward flow pipe 47 connects back to top level 33 to complete the water cycle loop. There is an air compressor 55 that has a compressed air outlet line 45 that has an outlet in the upward flow pipe 47. The compressed air outlet line 45 discharges at some measurable level below the top level 33 of the water cycle loop. As discussed above, the deeper its location, the greater the apparent head differential between the downward flowing side and the upward flowing side to create more power to drive turbine 53 of turbine-driven electric power generator 49. Turbine 53 drives electric power generator 49 to produce electricity and the turbine 53 is located upstream (below) the compressed air outlet, as shown. When the compressor 55 is not operating, the upward flow side and the downward flow side of the loop have the same top elevation, namely, top level 33. However, when air compressor 55 is turned on, the air flowing into the pipe 45 creates an apparent or virtual water top at the outlet level and a virtual head of water with ahead differential of about of $h_0$ is established. Further, the cycling water usually has a temperature differential between the bottom 39 and ambient at the top, so that the cycling water may be used in any conventional geothermal system for heating and/or cooling using well known geothermal heat exchange systems.

Figure 3:
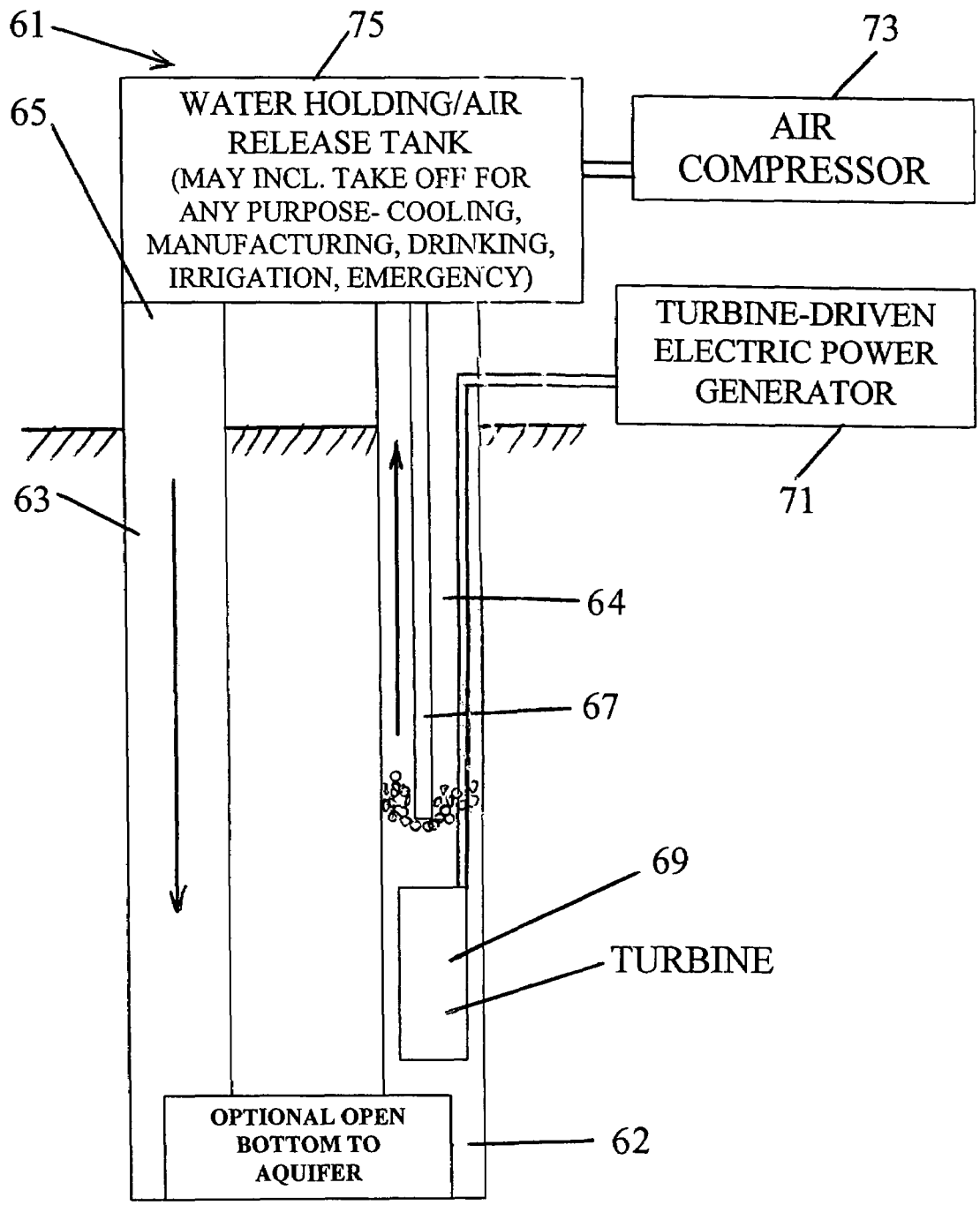
FIG. 3 illustrates the present invention water cycling system with compressor motive force and with turbine electric power generation for an in-ground water cycling system.

FIG. 3 illustrates the present invention water cycling system with compressor motive force and with turbine electric power generation for any type of in-ground water cycling system. FIG. 3 illustrates a present invention water cycling system 61 with a circuitous loop of water flow made up of a top level 65 with a water holding/air release tank 75. Tank 75 has an air vent at the apex. System 61 has a downward flowing side, namely, downward flow conduit 63, bottom 62 and an upward flowing side, namely, upward flow conduit 64. Upward flow conduit 64 connects back to top level 65 to complete the water cycle loop. There is an air compressor 73 that has a compressed air outlet line 67 that has an outlet in the upward flow conduit 64. The compressed air outlet line 67 discharges at the level shown, below the top level 65 of the water cycle loop. As discussed above, the deeper its location, the greater the apparent head differential between the downward flowing side and the upward flowing side to create more power to drive turbine of turbine-driven electric power generator 71. The turbine 69 drives electric power generator 71 to produce electricity. The turbine 69 is located upstream (below) the compressed air outlet, as shown. When the compressor 73 is not operating, the upward flow side and the downward flow side of the loop have the same top elevation, namely, top level 65. However, when air compressor 73 is turned on, the air flowing into the upward flow conduit 64 creates an apparent or virtual water top at the outlet level and a virtual head of water with ahead differential of about of $h_0$ is established. Tank 75 may function only as a water holding tank with air release or it may serve another purpose such as a water source for drinking water (a well), for irrigation, for cooling, for manufacturing purposes, for emergency purposes such as fires, or any other water storage use.

Figure 4:
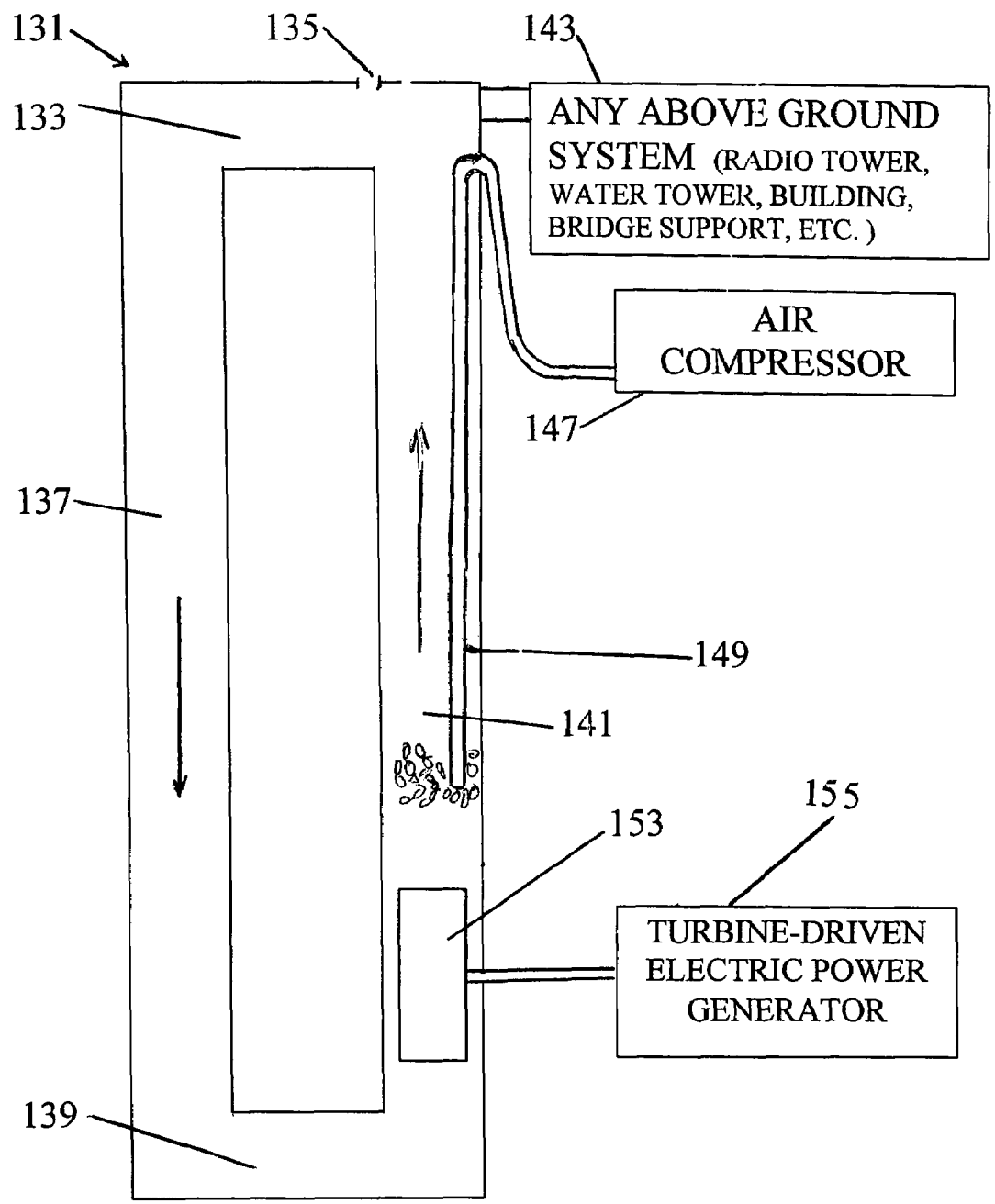
FIG. 4 illustrates the present invention water cycling system with compressor motive force and with turbine electric power generation for an above-ground water cycling system; and, FIG. 5 shows a front cut view of the present invention water cycling system with compressor motive force and with turbine electric power generation for any present invention system, including in-ground water cycling systems, geothermal in-ground water cycling systems and above ground systems.

FIG. 4 illustrates the present invention water cycling system with compressor motive force and with turbine electric power generation for any type of above ground water cycling system. The above ground system could be one that involves water, such as a water tower, or one that does not, such as a building, a bridge support or a radio tower. The concept here is to use the height of a pre-existing structure or to create a structure to support the present invention system for above ground power generation. Thus, FIG. 4 illustrates a present invention water cycling system 131 with a circuitous loop of water flow made up of a top level 133 that could be connected structurally and flow-wise to a water tower or only structurally connected to any of the foregoing. There is an air vent 135 at the apex. System 131 has a downward flowing side, namely, downward flow conduit 137, bottom 139 and an upward flowing side, namely, upward flow conduit 141. Upward flow conduit 141 connects back to top level 133 to complete the water cycle loop. There is an air compressor 147 that has a compressed air outlet line 149 that has an outlet in the upward flow conduit 141. The compressed air outlet line 149 discharges at the level shown, below the top level 133 of the water cycle loop. As discussed above, the deeper its location, the greater the apparent head differential between the downward flowing side and the upward flowing side to create more power to drive turbine of turbine-driven electric power generator 155. The turbine 153 drives electric power generator 155 to produce electricity. The turbine 153 is located upstream (below) the compressed air outlet, as shown. When the compressor 147 is not operating, the upward flow side and the downward flow side of the loop have the same top elevation, namely, top level 133. However, when air compressor 147 is turned on, the air flowing into the upward flow conduit 141 creates an apparent or virtual water top at the outlet level and a virtual head of water with a head differential that would approximate the difference between the top of the system and the air outlet line.

Figure 5:
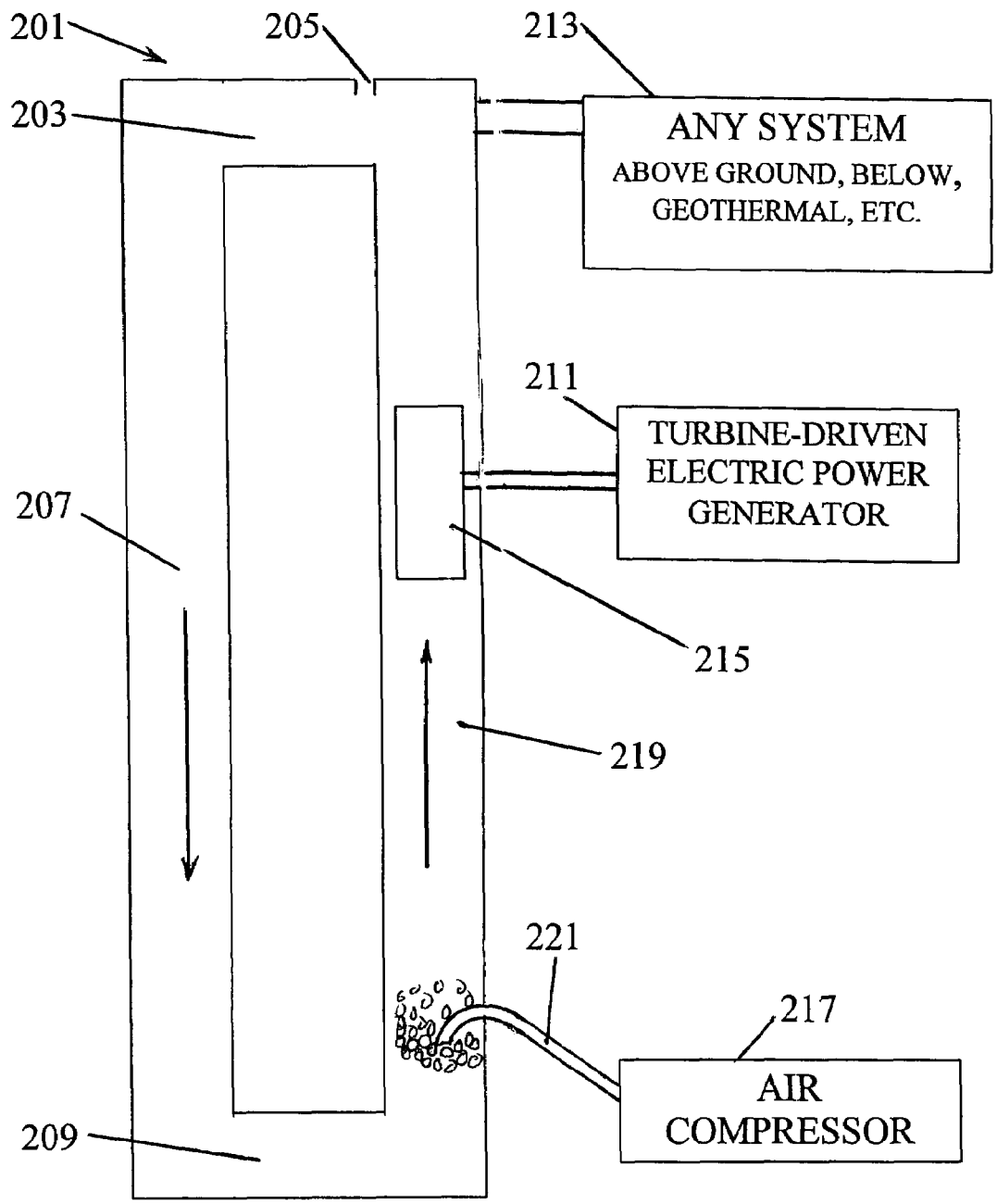

FIG. 5 shows a front cut view of the present invention water cycling system with compressor motive force and with turbine electric power generation for an in-ground water cycling system. This system could be one that is above ground that involves water, such as a water tower, or one that does not, such as a building, a bridge support or a radio tower. Alternatively, any below ground system described above, or even a combination system that is part above and part below ground, could be used. Here the relative positions of the compressed air line outlet and the turbine are reversed as compared to those previously described. Thus, FIG. 5 illustrates a present invention water cycling system 131 with a circuitous loop of water flow made up of a top level 133 that could be connected structurally and flow-wise to a water tower or only structurally connected to any of the foregoing. There is an air vent 135 at the apex. System 131 has a downward flowing side, namely, downward flow conduit 137, bottom 139 and an upward flowing side, namely, upward flow conduit 141. Upward flow conduit 141 connects back to top level 133 to complete the water cycle loop. There is an air compressor 147 that has a compressed air outlet line 149 that has an outlet in the upward flow conduit 141. The compressed air outlet line 149 discharges at the level shown, below the top level 133 of the water cycle loop. As discussed above, the deeper its location, the greater the apparent head differential between the downward flowing side and the upward flowing side to create more power to drive turbine of turbine-driven electric power generator 155. The turbine 153 drives electric power generator 155 to produce electricity. The turbine 153 is located upstream (below) the compressed air outlet, as shown. When the compressor 147 is not operating, the upward flow side and the downward flow side of the loop have the same top elevation, namely, top level 133. However, when air compressor 147 is turned on, the air flowing into the upward flow conduit 141 creates an apparent or virtual water top at the outlet level and a virtual head of water with a head differential that would approximate the difference between the top of the system and the air outlet line.

Figure 6:
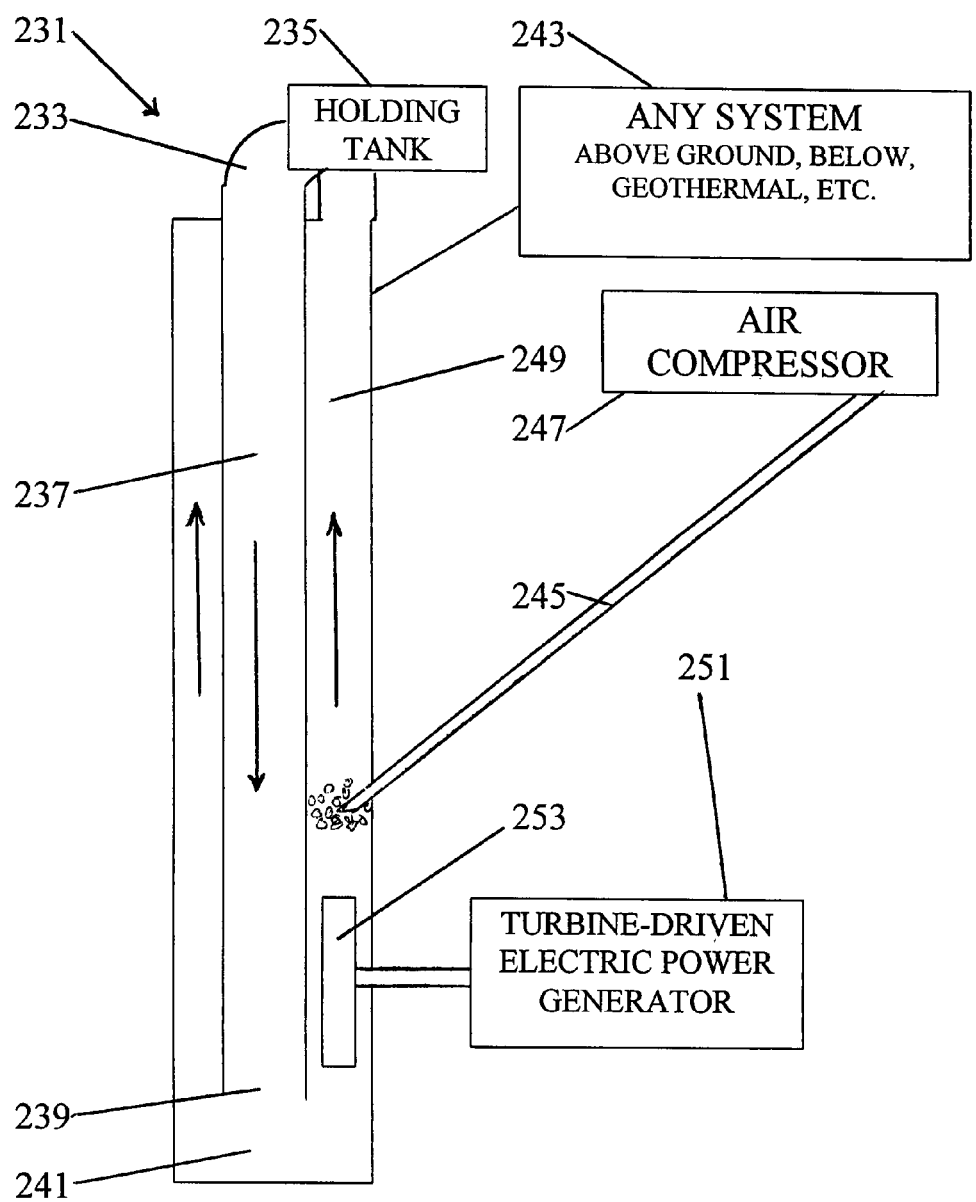
FIG. 6 illustrates present invention systems with concentric conduits with downward flow on the inside (center space), upward flow on the outside (annular space) and the turbine below the compressed air exit on the outside.

FIG. 6 shows a front cut view of the present invention water cycling system with compressor motive force and with turbine electric power generation for any water cycling system wherein a concentric arrangement of pipe or conduit or combination thereof, is utilized. This system could be one that is above ground that involves water, such as a water tower, or one that does not, such as a building, a bridge support or a radio tower. Alternatively, any below ground system described above, or even a combination system that is part above and part below ground, could be used. In this figure, the upward flow conduit or pipe and the downward flow conduit or pipe are positioned one inside the other rather than separate from one another, as shown in the previous figures. Thus, FIG. 6 illustrates a present invention water cycling system 231 with a circuitous loop of water flow made up of a top level 233 that could be connected structurally and flow-wise to a water tower or only structurally connected to any of the foregoing. Holding tank 235 includes air venting and broadly represents the holding tank and/or other functional aspects of any system 243. System 231 has a downward flowing side, namely, downward flow conduit 237, and its bottom 239 empties into bottom 241 of concentric upward flow conduit 249. Upward flow conduit 249 connects back to top level 233 to complete the water cycle loop. There is an air compressor 247 that has a compressed air outlet line 245 that has an outlet in the upward flow conduit 249. The compressed air outlet line 245 discharges at the level shown, below the top level 233 of the water cycle loop. As discussed above, the deeper its location, the greater the apparent head differential between the downward flowing side and the upward flowing side to create more power to drive turbine of turbine-driven electric power generator 257. The turbine 253 drives electric power generator 257 to produce electricity. The turbine 253 is located upstream (below) the compressed air outlet, as shown. When the compressor 247 is not operating, the upward flow side and the downward flow side of the loop have the same top elevation, namely, top level 233. However, when air compressor 247 is turned on, the air flowing into the upward flow conduit 249 creates an apparent or virtual water top at the outlet level and a virtual head of water with a head differential that would approximate the difference between the top of the system and the air outlet line.

The following are examples with various parameters changed:

Examples 1 Through 5

A concentric pipe arrangement was set up in accordance with FIG. 6 above in an in-ground well. The well is drilled to approximately 300 feet and outer piping of about 12 inch diameter is placed in the well. A concentric center pipe of about 6 inches is inserted and the system is arranged as to compressor and lines to make a water cycling loop as in FIG. 6. The compressor used is an IR model 1 XP with a 375 cfm rating. A 1 inch air hose is connected to the compressor and the hose outlet is set 140 feet into the outside pipe (the upwardly flowing side, or upside of the loop. A water discharge tube is located at the top 233 of system 231 of FIG. 6 and is replaced with different diameter sizes and the discharge pressure is measured. Table 1 below shows the test results:

TABLE 1

Varying Water Discharge Tube Diameters

| Example | Discharge Tube Dia. | Discharge Pressure | Flow Rate (GPM) | Air Pressure |
|---|---|---|---|---|
| 1 | 6 inches | 0 to 2 in. | 300 | 80 |
| 2 | 4 inches | 2 to 4 in. | 300 | 80 |
| 3 | 3 inches | 12 in. | 300 | 80 |
| 4 | 2 inches | 28 in. | 250 | 80 |
| 5 | 1½ inches | 35 in. | 200 | 80 |

These Examples show that the discharge pressure is a function of the diameter of the discharge tube and that the smaller diameters have tremendous force to drive a turbine.

Examples 6 Through 10

Although it is theoretical in the sense of being an accepted hypothesis, it is believed that in the present invention system, the insertion of air, at sufficient rates, into the upside of the water cycle loop down into the pipe or conduit, creates an artificial top or air blanket to establish an elevational difference between the downside and the upside of the loop, i.e. the downside column of water is very tall and the apparent upside column of water seeing the air blanket is very short. This creates an apparent height differential that results in an artificially created head that would be somewhat equal to the difference between the downside column of water and the upside column of water up to the air blanket. While the compressed air is constantly replacing the rising, mixing air, the immediately entering air either blankets or thins out the area of water creating the artificial head. One test to determine if this hypothesis might be correct is to turn on the compressor and keep all other variables constant and alter the height location of the compressed air inlet to test the water exit rate at the top 233 into the holding tank 235 in FIG. 6. These Examples 6 through 10 use the same equipment as in the previous Examples, but have a fixed water discharge tube into the tank 235 of 2 inch diameter and the depth of the compressor air outlet is altered to test the otherwise fixed system at different depths. The results are shown in Table 2 below:

TABLE 2

Varying Air Outlet Depths For 2 Inch Water Discharge Tube

| Example | Air Outlet Depth | Air Pressure | Discharge Pressure | Flow Rate (GPM) |
|---|---|---|---|---|
| 6 | 100 Feet | 58 | 4 | 160 |
| 7 | 150 Feet | 75 | 5 | 180 |
| 8 | 200 Feet | 98 | 5 | 200 |
| 9 | 250 Feet | 118 | 5 | 200 |
| 10 | 270 Feet | 125 | 6-7 | 220 |

Examples 11 Through 26

The data in Table 2 shows that the flow rate increased from depths of 100 down to 200 feet and then stabilized, and the discharge pressure increased slightly with increased depth. To further test the hypothesis, the Examples 6 through 10 tests were repeated for sets of test each for five additional water discharge tube sizes. The results and Examples are set forth in Table 3 for a 1½ inch discharge tube, Table 4 for a 1¼ inch discharge tube, Table 5 for a 1 inch discharge tube, Table 6 for a ¾ inch discharge tube and Table 7 for ½ inch tube.

TABLE 3

Varying Air Outlet Depths For 1½ Inch Water Discharge Tube

| Example | Air Outlet Depth | Air Pressure | Discharge Pressure | Flow Rate (GPM) |
|---|---|---|---|---|
| 11 | 100 Feet | 58 | 6 | 160 |
| 12 | 150 Feet | 75 | 5 | 160 |
| 13 | 200 Feet | 98 | 10 | 200 |
| 14 | 250 Feet | 118 | 6 | 200 |
| 15 | 270 Feet | 125 | 8 | 185 |

TABLE 4

Varying Air Outlet Depths For 1¼ Inch Water Discharge Tube

| Example | Air Outlet Depth | Air Pressure | Discharge Pressure | Flow Rate (GPM) |
|---|---|---|---|---|
| 16 | 100 Feet | 58 | 8 | 130 |
| 17 | 150 Feet | 75 | 8 | 150 |
| 18 | 200 Feet | 98 | 8 | 170 |
| 19 | 250 Feet | 118 | 8 | 165 |
| 20 | 270 Feet | 125 | 9 | 165 |

TABLE 5

Varying Air Outlet Depths For 1 Inch Water Discharge Tube

| Example | Air Outlet Depth | Air Pressure | Discharge Pressure | Flow Rate (GPM) |
|---|---|---|---|---|
| 21 | 100 Feet Burping | 58 | 8 | 90 |
| 22 | 150 Feet Burping | 58 | 10 | 105 |
| 23 | 250 Feet | 118 | 12 | 120 |
| 24 | 270 Feet | 125 | 15 | 115 |

TABLE 6

Varying Air Outlet Depths For ¾ Inch Water Discharge Tube

| Example | Air Outlet Depth | Air Pressure | Discharge Pressure | Flow Rate (GPM) |
|---|---|---|---|---|
| 25 | | 58 | 10 | 75 |

(Flow rate too slow for system - no further testing for this size water discharge tube.)

TABLE 7

Varying Air Outlet Depths For ½ Inch Water Discharge Tube

| Example | Air Outlet Depth | Air Pressure | Discharge Pressure | Flow Rate (GPM) |
|---|---|---|---|---|
| 26 | 100 Feet | 58 | 10 | 60 |

(Flow rate too slow for system- no further testing for this size water discharge tube.)

The results of these tests show that both the water discharge tube diameter and the air outlet depth play rolls in the flow rate. Given a fixed discharge diameter, it appears that the flow rate increases with increasing depth down to a depth where the weight of the water above the air outlet may be too great to be overcome in a blanketing fashion for the limitations of a particular compressor. Likewise, if the diameter of the loop is too small (as represented by the different sizes of the discharge tube in the above Examples), the depth of the air compressor tube might only make a small difference.

Figure 7:
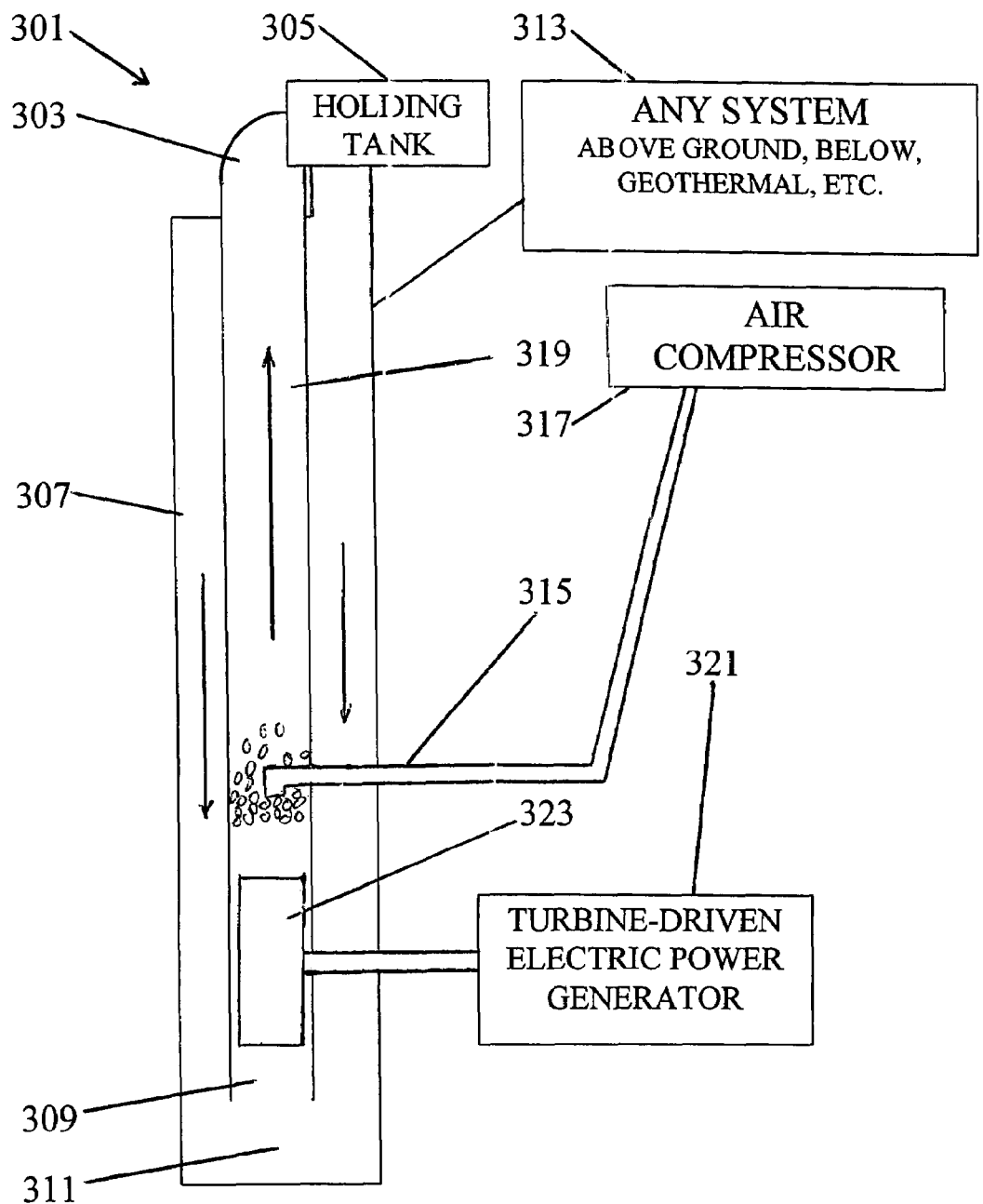
FIG. 7 illustrates present invention systems with concentric conduits with upward flow on the inside (center space), downward flow on the outside (annular space) and the turbine below the compressed air exit on the inside.

FIG. 7 shows a front cut view of the present invention water cycling system with compressor motive force and with turbine electric power generation for any water cycling system wherein a concentric arrangement of pipe or conduit or combination thereof, is utilized. This system could be one that is above ground that involves water, such as a water tower, or one that does not, such as a building, a bridge support or a radio tower. Alternatively, any below ground system described above, or even a combination system that is part above and part below ground, could be used. In this figure, the upward flow conduit or pipe and the downward flow conduit or pipe are positioned one inside the other rather than separate from one another, as shown in the previous figures. Thus, FIG. 7 illustrates a present invention water cycling system 301 with a circuitous loop of water flow made up of a top level 303 that could be connected structurally and flow-wise to a water tower or only structurally connected to any of the foregoing. Holding tank 305 includes air venting and broadly represents the holding tank and/or other functional aspects of any system 301. System 301 has a downward flowing side, namely, downward flow conduit 307, and its bottom 311 flows into bottom 309 of central (inside) concentric upward flow conduit 319. Upward flow conduit 319 connects back to top level 303 to complete the water cycle loop. There is an air compressor 317 that has a compressed air outlet line 315 that has an outlet in the upward flow conduit 319. The compressed air outlet line 315 discharges at the level shown, below the top level 303 of the water cycle loop. As discussed above, the deeper its location, the greater the apparent head differential between the downward flowing side and the upward flowing side to create more power to drive turbine of turbine-driven electric power generator 321. The turbine 323 drives electric power generator 321 to produce electricity. The turbine 323 is located upstream (below) the compressed air outlet, as shown. When the compressor 317 is not operating, the upward flow side and the downward flow side of the loop have the same top elevation, namely, top level 303. However, when air compressor 317 is turned on, the air flowing into the upward flow conduit 319 creates an apparent or virtual water top at the outlet level and creates a virtual head of water with a head differential that would approximate the difference between the top of the system and the level at which the compressed air outlet is placed.

Figure 8:
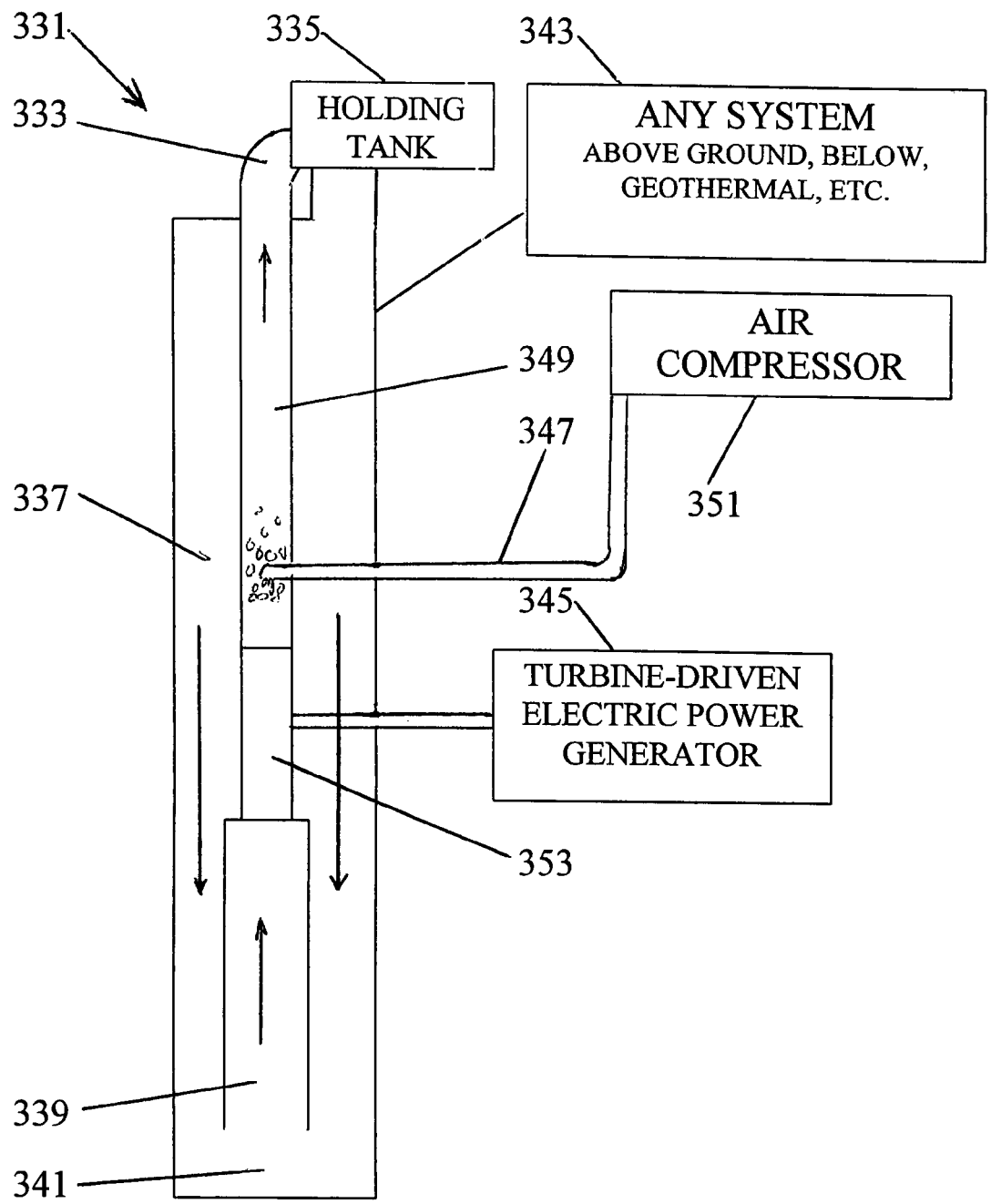
FIG. 8 illustrates present invention systems similar to that shown in FIG. 7, except that the upside conduit is screwed directly into the top of the turbine.

FIG. 8 shows a front cut view of the present invention water cycling system with compressor motive force and with turbine electric power generation for any water cycling system wherein a concentric arrangement of pipe or conduit or combination thereof, is utilized. This system could be one that is above ground that involves water, such as a water tower, or one that does not, such as a building, a bridge support or a radio tower. Alternatively, any below ground system described above, or even a combination system that is part above and part below ground, could be used. In this FIG. 8 the system is the same as that in FIG. 7, except that both the turbine and the upper portion of the upward flow conduit are connected to each other rather than the turbine placed inside of it. FIG. 8 illustrates a present invention water cycling system 331 with a circuitous loop of water flow made up of a top level 333 that could be connected structurally and flow-wise to a water tower or only structurally connected to any of the foregoing. Holding tank 335 includes air venting and broadly represents the holding tank and/or other functional aspects of any system 343. System 331 has a downward flowing side, namely, outer downward flow conduit 337, and its bottom 341 flows into bottom 339 of inner concentric upward flow conduit 349. Upward flow conduit 349 connects back to top level 333 to complete the water cycle loop that passes through the tank 335 or its equivalent (e.g., water tower, etc, such as described in prior Figures. There is an air compressor 351 that has a compressed air outlet line 347 that has an outlet in the upward flow conduit 349. The compressed air outlet line 347 discharges at the level shown, below the top level 333 of the water cycle loop. As discussed above, the deeper its location, the greater the apparent head differential between the downward flowing side and the upward flowing side to create more power to drive turbine of turbine-driven electric power generator 345. The turbine 353 drives electric power generator 345 to produce electricity. The turbine 353 is located upstream (below) the compressed air outlet, as shown. It has a exit pipe connected to it that is threaded (not shown) so that the turbine 353 connects directly to upward flow conduit 349. It otherwise operates in the same fashion as system 301 in FIG. 7.

Figure 9:
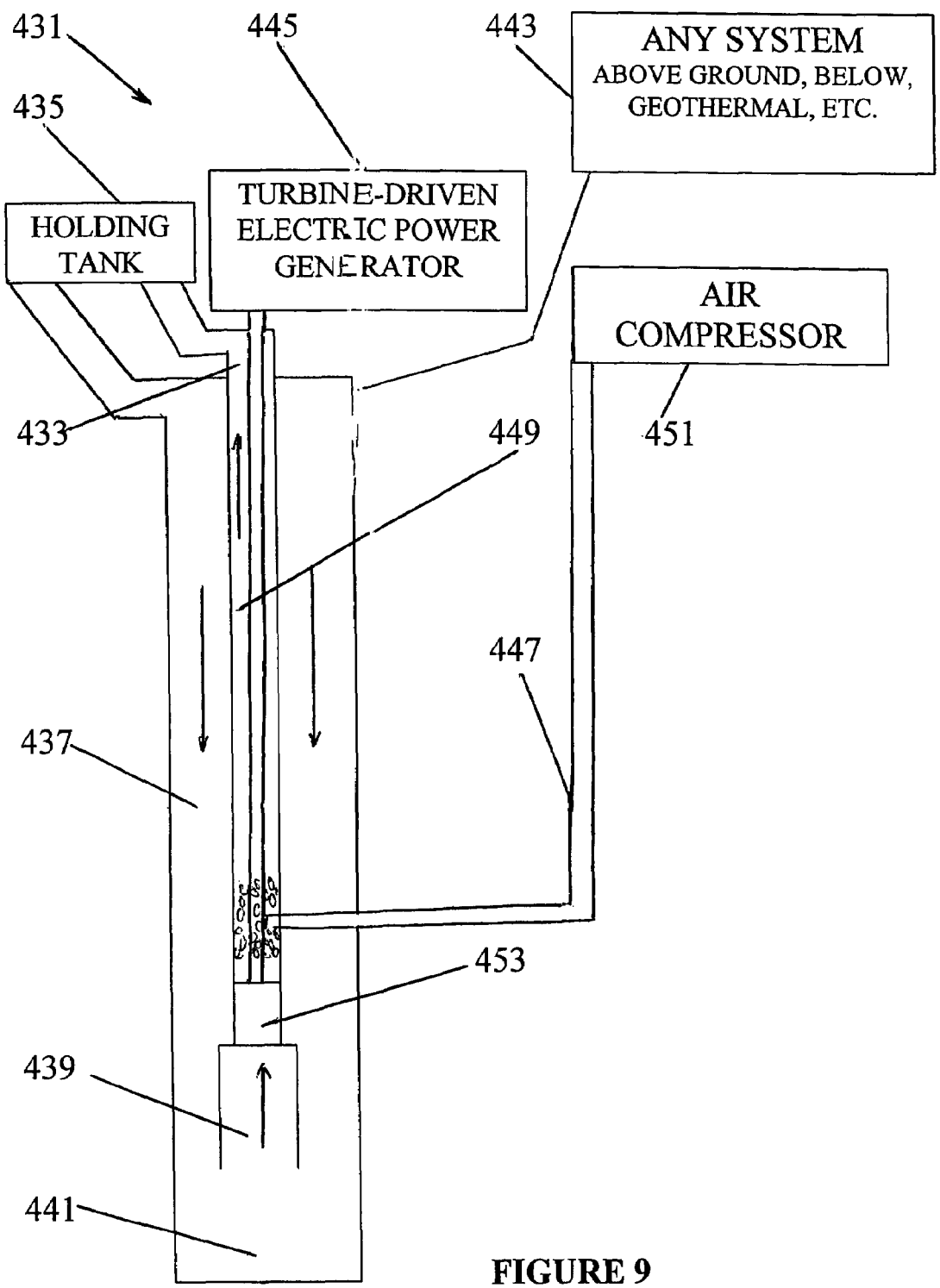
FIG. 9 illustrates present invention systems similar to that shown in FIG. 8, except that the turbine has a vertical drive shaft extending through the top level and into the generator located above the water cycling loop; and, FIG. 10 illustrates present invention systems similar to that shown in FIG. 9, except that the turbine and the generator are both located within the water cycling loop and an electric power outlet line extends through the top level to provide the produced power.

FIG. 9 shows a front cut view of the present invention water cycling system with compressor motive force and with turbine electric power generation for any water cycling system wherein a concentric arrangement of pipe or conduit or combination thereof, is utilized. This system could be one that is above ground that involves water, such as a water tower, or one that does not, such as a building, a bridge support or a radio tower. Alternatively, any below ground system described above, or even a combination system that is part above and part below ground, could be used. In this FIG. 9 the system is the same as that in FIG. 8, except that the drive for the generator is not a side take-off, but instead is a vertical drive shaft that extends to the top of the system where the generator is located. While especially advantageous for in-ground systems, it can be used for any present invention system. FIG. 9 illustrates a present invention water cycling system 431 with a circuitous loop of water flow made up of a top level 433 that could be connected structurally and flow-wise to a water tower or only structurally connected to any of the foregoing. Holding tank 435 includes air venting and broadly represents the holding tank and/or other functional aspects of any system 443. System 431 has a downward flowing side, namely, outer downward flow conduit 437, and its bottom 441 flows into bottom 439 of inner concentric upward flow conduit 449. Upward flow conduit 449 connects back to top level 433 to complete the water cycle loop that passes through the tank 435 or its equivalent (e.g., water tower, etc, such as described in prior Figures. There is an air compressor 451 that has a compressed air outlet line 447 that has an outlet in the upward flow conduit 449. The compressed air outlet line 447 discharges at the level shown, below the top level 433 of the water cycle loop. As discussed above, the deeper its location, the greater the apparent head differential between the downward flowing side and the upward flowing side to create more power to drive turbine 453 of turbine-driven electric power generator 445. The turbine 453 is connected via the vertical drive shaft to and drives electric power generator 445 to produce electricity. The turbine 453 is located upstream (below) the compressed air outlet, as shown. When the compressor 451 is not operating, the upward flow side and the downward flow side of the loop have the same top elevation, namely, top level 433. However, when air compressor 451 is turned on, the air flowing into the upward flow conduit 449 creates an apparent or virtual water top at the outlet level and a virtual head of water with a head differential that would approximate the difference between the top of the system and the level at which the compressed air outlet is placed.

Figure 10:
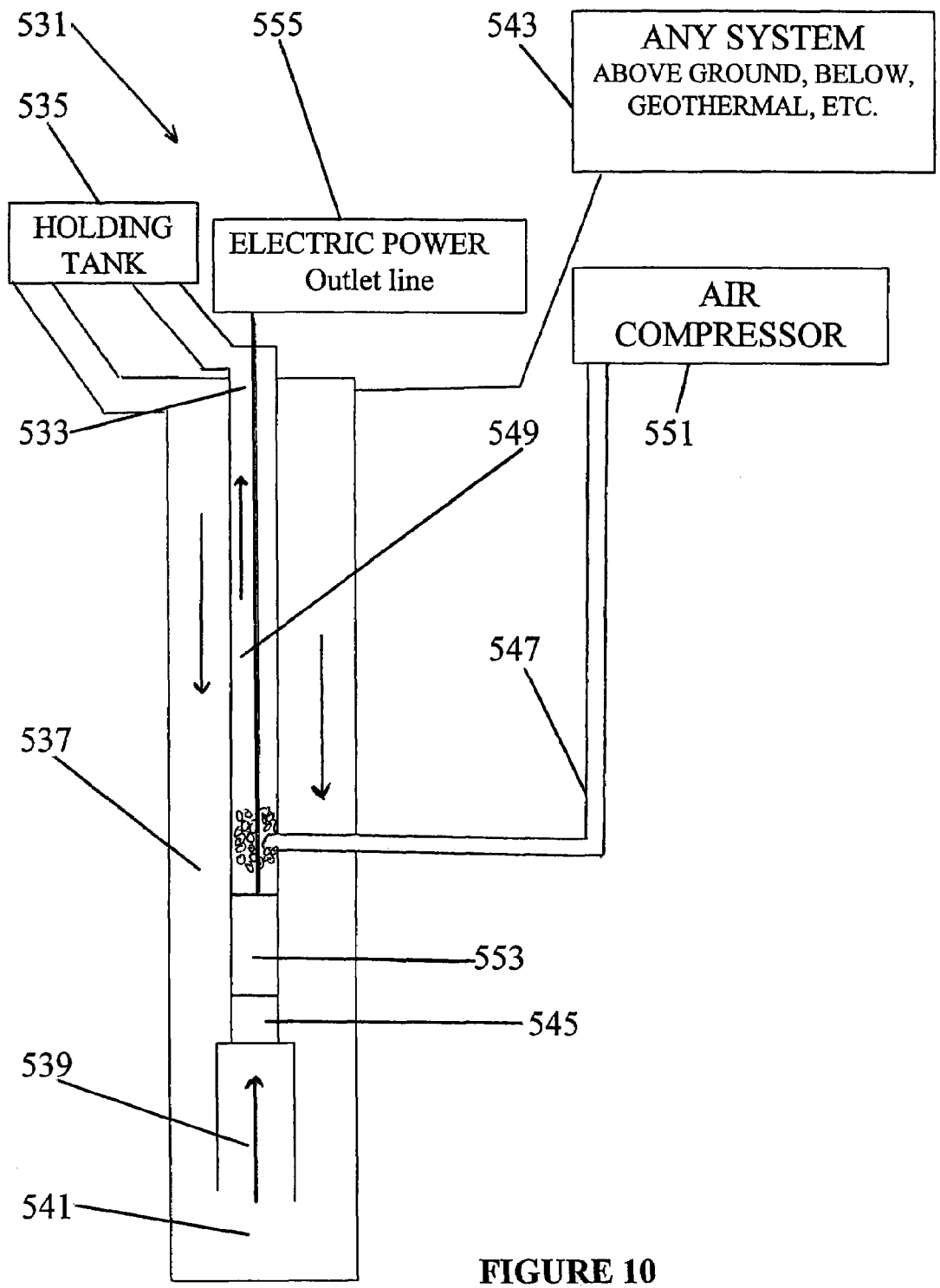

FIG. 10 shows a front cut view of the present invention water cycling system with compressor motive force and with turbine electric power generation for any water cycling system wherein a concentric arrangement of pipe or conduit or combination thereof, is utilized. This system could be one that is above ground that involves water, such as a water tower, or one that does not, such as a building, a bridge support or a radio tower. Alternatively, any below ground system described above, or even a combination system that is part above and part below ground, could be used. In this FIG. 10 the system is the same as that in FIG. 9, except that both the turbine and the generator are placed within the pipes or conduits. FIG. 10 illustrates a present invention water cycling system 531 with a circuitous loop of water flow made up of a top level 533 that could be connected structurally and flow-wise to a water tower or only structurally connected to any of the foregoing. Holding tank 535 includes air venting and broadly represents the holding tank and/or other functional aspects of any system 543. System 531 has a downward flowing side, namely, outer downward flow conduit 537, and its bottom 541 flows into bottom 539 of inner concentric upward flow conduit 549. Upward flow conduit 549 connects back to top level 533 to complete the water cycle loop that passes through the tank 535 or its equivalent (e.g., water tower, etc, such as described in prior Figures. There is an air compressor 551 that has a compressed air outlet line 547 that has an outlet in the upward flow conduit 549. The compressed air outlet line 547 discharges at the level shown, below the top level 533 of the water cycle loop. As discussed above, the deeper its location, the greater the apparent head differential between the downward flowing side and the upward flowing side to create more power to drive turbine of turbine-driven electric power generator 553. The turbine 545 drives electric power generator 553 to produce electricity. The turbine 545 is located upstream (below) from the generator 553 and the compressed air outlet 547, as shown. The system operates in the same manner as the systems described immediately above.

Examples 27 Through 29

A present invention system similar to that shown in FIG. 10 is tested with a compressed air outlet line at various depths to 280 feet in a 300 foot deep loop. Table 7 shows the results.

TABLE 7

Varying Air Outlet Depths For ¾ Inch Water Discharge Tube (FIG. 10)

| Example | Air Outlet Depth | Air Pressure | Discharge Pressure | Flow Rate (GPM) |
| --- | --- | --- | --- | --- |
| 27 | 175 | 118 | 5 | 210 |
| 28 | 250 | 118 | 5 | 300 |
| 29 | 280 | 118 | 5 | 300 |

Given the system results, it is seen that the FIG. 10 system, with a total depth of 300 feet for the loop sides and a compressor air inlet placement depth of 280 feet, the amount of horsepower that could be generated based on the artificial head differential of 280 feet is determined by the formula:

$HP = (GPM \times TDH)/(3960 \times Efficiency)$

For this system and arrangements:

$HP = (400 \times 280)/(3960 \times 0.80) = 35$ horsepower

Given that the compressor is a 5 horsepower device, the theoretical net gain is about 30 horsepower at an 80% efficiency.

Although particular embodiments of the invention have been described in detail herein with reference to the accompanying drawings, it is to be understood that the invention is not limited to those particular embodiments, and that various changes and modifications may be effected therein by one skilled in the art without departing from the scope or spirit of the invention as defined in the appended claims.

What is claimed is:

1. A water cycling system with compressor motive force and with turbine electric power generation, which comprises:
    (a) a water piping subsystem that has a circuitous loop means for continuously or intermittently circulating water in said circuitous loop means, said circuitous loop means having an upward flowing side and a downward flowing side, said circuitous loop means having a bottom level and a top level with a head differential of at least fifty feet between said bottom level and said top level;
    (b) an air compressor subsystem including at least one air compressor having a compressed air outlet with said air outlet located below said top level in said upwardly flowing side of said circuitous loop means;
    (c) at least one electric power generating water-driven turbine located within said loop; and,
    (d) at least one water pump located within said circuitous loop means.

2. The water cycling system of claim 1, wherein said compressed air outlet is positioned at least fifty feet below said top level of said circuitous loop means.

3. The water cycling system of claim 1, wherein said turbine is located upstream from said compressed air outlet.

4. The water cycling system of claim 3, wherein said electric power generating water-driven turbine is located proximate said bottom level of said circuitous loop means.

5. The water cycling system of claim 1, wherein said head differential of said well is at least one hundred feet.

6. The water cycling system of claim 1, wherein said water piping subsystem is a well.

7. A water cycling system with compressor motive force and with turbine electric power generation, which comprises:
    (a) a geothermal well that has a circuitous loop means for continuously or intermittently circulating water in said circuitous loop means, said circuitous loop means having an upward flowing side and a downward flowing side, said circuitous loop means having a bottom level and a top level with a head differential of at least fifty feet between said bottom level and said top level;
    (b) an air compressor subsystem including at least one air compressor having a compressed air outlet with said air outlet being located below said top level in said upwardly flowing side of said loop;
    (c) at least one electric power generating water-driven turbine located within said loop; and,
    (d) at least one water pump located within said circuitous loop means.

8. The water cycling system of claim 7, wherein said compressed air outlet is positioned at least fifty feet below, said top level of said loop.

9. The water cycling system of claim 7, wherein said at least one water pump is located within said circuitous loop means upstream from said at least one electric power generating water-driven turbine.

10. The water cycling system of claim 7, wherein said turbine is located upstream from said compressed air outlet.

11. The water cycling system of claim 10, wherein said electric power generating water-driven turbine is located proximate said bottom level of said loop.

12. The water cycling system of claim 1, wherein said head differential of said geothermal well is at least one hundred feet.

* * * * *